(12) United States Patent
Stevens

(10) Patent No.: US 11,791,100 B2
(45) Date of Patent: Oct. 17, 2023

(54) FILM CAPACITOR WITH COATED DIELECTRIC LAYER

(71) Applicant: VISHAY ELECTRONIC GMBH, Selb (DE)

(72) Inventor: Geert Stevens, Zonnebeke (BE)

(73) Assignee: VISHAY ELECTRONIC GMBH

( * ) Notice: Subject to any disclaimer, the term of this patent is extended or adjusted under 35 U.S.C. 154(b) by 0 days.

(21) Appl. No.: 17/282,321

(22) PCT Filed: Oct. 2, 2019

(86) PCT No.: PCT/EP2019/076752
§ 371 (c)(1),
(2) Date: Apr. 1, 2021

(87) PCT Pub. No.: WO2020/070213
PCT Pub. Date: Apr. 9, 2020

(65) Prior Publication Data
US 2021/0383974 A1    Dec. 9, 2021

Related U.S. Application Data

(60) Provisional application No. 62/740,768, filed on Oct. 3, 2018.

(51) Int. Cl.
*H01G 4/232* (2006.01)
*H01G 4/018* (2006.01)
*H01G 4/38* (2006.01)

(52) U.S. Cl.
CPC ............ *H01G 4/232* (2013.01); *H01G 4/018* (2013.01); *H01G 4/38* (2013.01)

(58) Field of Classification Search
CPC ........... H01G 4/38; H01G 4/232; H01G 4/018
See application file for complete search history.

(56) References Cited

U.S. PATENT DOCUMENTS

| 3,654,531 A | 4/1972 | Rayburn |
| 4,656,557 A | 4/1987 | Behn et al. |

(Continued)

FOREIGN PATENT DOCUMENTS

| BE | 488 523 A | 4/1949 | |
| CN | 2705870 Y * | 5/2004 | ............... H01G 2/08 |

(Continued)

*Primary Examiner* — David M Sinclair
(74) *Attorney, Agent, or Firm* — Volpe Koenig

(57) ABSTRACT

A film capacitor preferably includes a single film capacitor layer wound around itself in adjacent layers to form a winding. The film capacitor layer preferably includes a dielectric film, a first metallization layer formed on the dielectric film, a dielectric coating formed on the first metallization layer, and a second metallization layer formed on the dielectric coating. A metallic contact layer is preferably formed on an outer edge of the winding. A terminal is preferably formed on an outer edge of the metallic contact layer. An insulating material preferably encapsulates the winding, the metallic contact layer, and a portion of the terminal. The capacitor as self-healing properties. Further, the border of the electrodes may be wave-cut. Further, an insulating gap may be added between the border and the upper electrode.

20 Claims, 13 Drawing Sheets

(56) References Cited

U.S. PATENT DOCUMENTS

| | | | | |
|---|---|---|---|---|
| 4,667,382 A | * | 5/1987 | Behn | H01G 4/30 |
| | | | | 29/25.42 |
| 5,737,179 A | * | 4/1998 | Shaw | H01G 4/20 |
| | | | | 361/312 |
| 5,933,318 A | * | 8/1999 | Tomono | H01G 4/30 |
| | | | | 29/25.42 |
| 6,111,743 A | | 8/2000 | Lavene | |
| 6,426,861 B1 | * | 7/2002 | Munshi | C08J 5/18 |
| | | | | 361/312 |
| 2003/0090854 A1 | * | 5/2003 | Eriksson | H01G 4/012 |
| | | | | 361/303 |
| 2009/0086402 A1 | * | 4/2009 | Kato | H01G 4/32 |
| | | | | 361/301.1 |
| 2009/0225491 A1 | * | 9/2009 | Yao | H01G 4/015 |
| | | | | 361/303 |
| 2010/0091425 A1 | * | 4/2010 | Takeoka | H01G 4/236 |
| | | | | 361/301.4 |
| 2011/0032656 A1 | * | 2/2011 | Ito | H01G 4/145 |
| | | | | 361/312 |

FOREIGN PATENT DOCUMENTS

| | | | | |
|---|---|---|---|---|
| CN | 201122516 Y | * | 9/2008 | H01G 4/18 |
| CN | 201122516 Y | | 9/2008 | |
| CN | 102683008 A | * | 9/2012 | H01G 4/18 |
| CN | 207397953 U | * | 5/2018 | |
| CN | 108878146 A | * | 11/2018 | |
| EP | 2023356 A1 | | 2/2009 | |
| JP | H05-243085 A | | 9/1993 | |
| JP | 2007019327 A | * | 1/2007 | H01G 2/08 |
| JP | 2009147255 A | * | 7/2009 | H01G 4/18 |
| WO | 95/03618 A1 | | 2/1995 | |
| WO | 2020/070213 A1 | | 4/2020 | |

* cited by examiner

FILM CAPACITOR WITH COATED DIELECTRIC LAYER

CROSS-REFERENCE TO RELATED APPLICATIONS

This application is a § 371 application of International Application Serial No. PCT/EP2019/076752, filed Oct. 2, 2019, which claims the benefit of U.S. Provisional Application No. 62/740,768, filed Oct. 3, 2018, the entire contents of which are incorporated herein by reference.

FIELD OF INVENTION

The present disclosure relates to capacitors for use in electronic equipment, and more particularly to film capacitors.

BACKGROUND

The following description relates to a dielectric film and a film capacitor. Film capacitors preferably include dielectric films that are, depending on the desired dielectric strength, drawn to a thin thickness. The dielectric films are preferably provided with electrodes. The electrodes of film capacitors are preferably metallized aluminum or zinc applied directly to the surface of the dielectric film, or are a separate metallic foil.

Typically, two layers of dielectric film and electrodes preferably are wound into a cylinder shaped winding, usually flattened to reduce mounting space requirements on a printed circuit board, or layered as multiple single layers stacked together, to form a capacitor body. Film capacitors are among the most common capacitor types for use in electronic equipment, and are used in many AC and DC microelectronics and electronics circuits.

SUMMARY

A film capacitor preferably includes a single film capacitor layer wound around itself in adjacent layers to form a winding. The film capacitor layer preferably includes a dielectric film, a first metallization layer formed on the dielectric film, a dielectric coating formed on the first metallization layer, and a second metallization layer formed on the dielectric coating. A metallic contact layer is preferably formed on an outer edge of the winding. A terminal is preferably formed on an outer edge of the metallic contact layer. An insulating material preferably encapsulates the winding, the metallic contact layer, and a portion of the terminal.

A method of forming a film capacitor preferably includes forming a film capacitor layer. The film capacitor layer preferably includes a first metallization layer formed on a dielectric film, a dielectric coating formed on the first metallization layer, and a second metallization layer formed on the dielectric coating. A winding is preferably formed by rolling the film capacitor layer around itself in adjacent layers. A metallic contact layer is preferably formed on an outer edge of the winding. A terminal is preferably formed on an outer edge of the metallic contact layer. The winding, the metallic contact layer, and a portion of the terminal is preferably encapsulated with an insulating material.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Examples of different film capacitor implementations will be described more fully hereinafter with reference to the accompanying drawings. These examples are not mutually exclusive, and features found in one example can be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be understood that these terms are intended to encompass different orientations of the element in addition to any orientation depicted in the figures.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

Figure 1A:
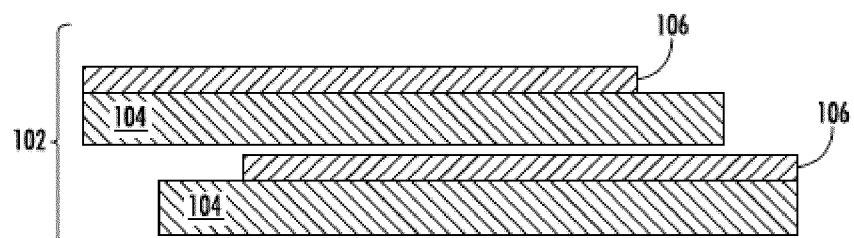
FIG. 1A is a cross section view of a capacitance layer of a conventional film capacitor.
Figure 1B:
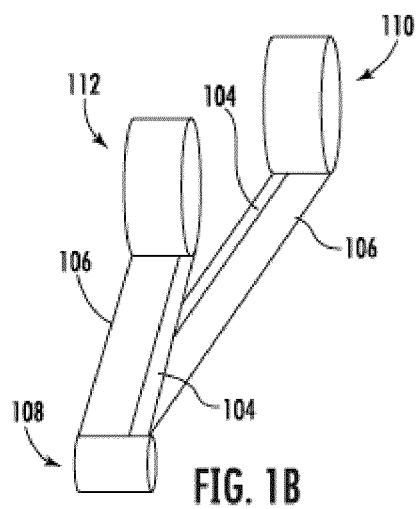
FIG. 1B shows a conventional process of rolling dielectric films and electrodes into a winding.

Referring now to FIGS. 1A-1B, different views illustrating assembly of a conventional film capacitor is shown. FIG. 1A shows a cross section view of a capacitance layer 102 of a conventional film capacitor. As described above, conventional film capacitors are preferably made out of two dielectric films 104 covered with metallic electrodes 106 that are then wound into a cylindrical shaped winding 108. The dielectric films 104 is preferably a plastic film comprising one or more of polypropylene (PP), polyester (PET), polyethylene naphthalate (PEN), polyphenylene sulfide (PPS), polytetrafluoroethylene (PTFE), polystyrene (PS), and polycarbonate (PC). The dielectric films 104 are preferably a thermoplastic polymer comprising one or more of polyimide (PI), polyamide (PA), polyvinylidene fluoride (PVDF), siloxane, polysulfone (PEx), and aromatic polyester (FPE). The dielectric films 104 are preferably composed of paper.

In a film/foil capacitor (or metal foil capacitor), each of the dielectric films 104 is preferably layered with a thin metal foil, usually aluminum, to serve as electrodes. Advantages of this construction type are easy electrical connection to the metal foil electrodes 106, and its ability to handle high current surges.

In another example, a film capacitor is preferably made of two metallized dielectric films 104. A thin vacuum-deposited metallization (e.g., zinc or aluminum) is preferably applied to one or both sides of the dielectric films 104 to serve as the electrodes 106. This configuration preferably has "self-healing" properties, in that dielectric breakdowns or short circuits between the electrodes 106 preferably not necessarily lead to the destruction of the component. With this design, it is possible to make high quality products such as "zero defect" capacitors and to produce wound capacitors with larger capacitance values (up to 100 µF and larger) in smaller cases (high volumetric efficiency) compared to the film/foil construction. However, the metallized construction preferably has a limited current surge rating.

FIG. 1B shows a conventional process of rolling the dielectric films 104 and the electrodes 106 into a winding 108. A first bobbin 110 and a second bobbin 112 are preferably rolled together into the cylindrical winding 108. The first bobbin 110 and the second bobbin 112 are preferably slit from a larger mother roll (not shown) and then wound together. The two dielectric films 104 and electrodes 106 that make up the capacitance layer 102 are preferably wound slightly offset from each other, so that one edge of the electrodes 106 on each end of the winding 108 extends out laterally.

The winding 108 is preferably flattened into an oval shape by applying mechanical pressure. Because the cost of a printed circuit board is calculated per square millimeter, a smaller capacitor footprint may reduce the overall cost of the circuit.

Figure 1C:
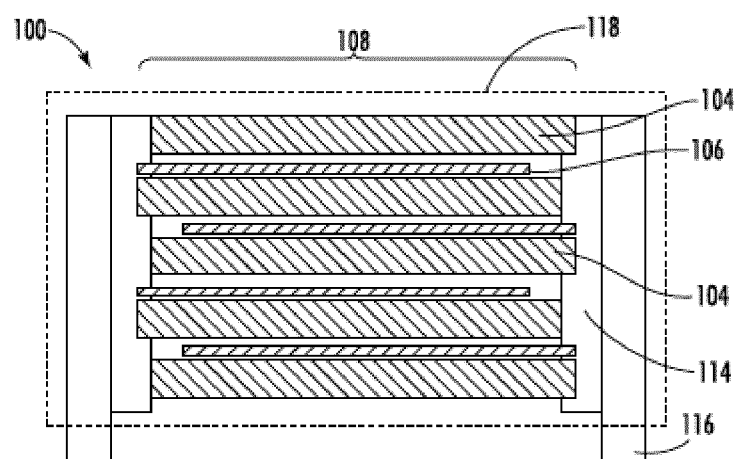
FIG. 1C is a cross section view the winding assembled into a conventional film capacitor.

FIG. 1C shows the winding 108 assembled into a conventional film capacitor 100. The projecting end electrodes 106 of the winding 108 are preferably covered with a liquefied contact metal (e.g., tin, zinc or aluminum), to form a metallic contact layer 114. The metallic contact layer 114 is preferably sprayed on both lateral ends of the winding 108 with compressed air. The winding 108 is preferably "healed" by applying a voltage across the electrodes 106 so that any existing defects are "burned away." The winding 108 is preferably impregnated with an insulating fluid, such as silicone oil, for increased protection of the capacitor against environmental influences. Terminals 116 are preferably soldered or welded on the metallic contact layer 114 and the winding 108 are preferably encapsulated in an insulating material 118.

As device size continues to shrink, smaller film capacitors are required. Typically, the overall size of a film capacitor is preferably reduced by reducing the overall thickness of the dielectric films (e.g., by drawing or stretching). However, as a dielectric film of a thin film capacitor is made thinner, problems arise such as an increase in a leak current, deterioration of a withstand voltage, and an increase in the number of short-circuit failures due to an increase in defects of the dielectric film. It may be desirable to produce a film capacitor with a reduced cross-sectional area that maintains a desirable capacitance/volume (C/V) and breakdown voltage.

The following description includes using multiple metallization layers, separated by a dielectric coating, formed on a single dielectric film to form at least one capacitance layer within the single dielectric film. This single dielectric film is preferably wound around itself in a winding to form an additional capacitance layer between an adjacent layer in the winding.

In an example, final capacitance of a film capacitor is preferably achieved by capacitors in parallel between different layers in a winding, capacitors in parallel between a dielectric coating, and capacitors in series on the dielectric coating.

Figure 2:
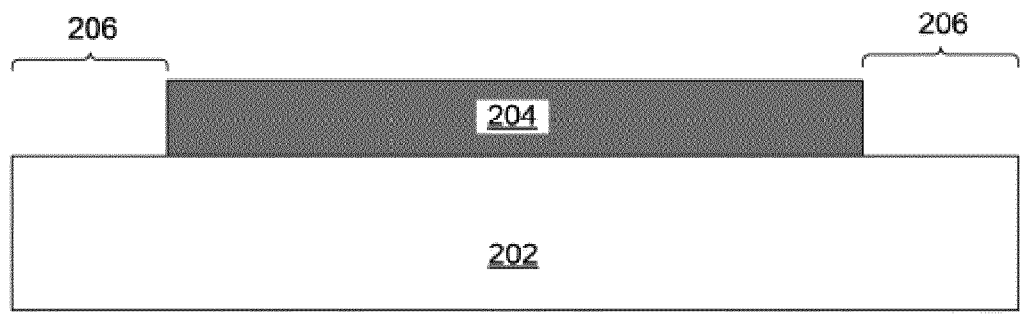
FIG. 2 is a cross section view illustrating forming a first metallization layer on a dielectric film.

Referring now to FIG. 2, a cross section view illustrating forming a first metallization layer 204 on a dielectric film 202 is shown. The dielectric film 202 is preferably composed of an electrically insulating material. The dielectric film 202 is preferably a plastic film comprising one or more of PP, PET, PEN, PPS, PTFE, PS, and PC. The dielectric film 202 is preferably a thermoplastic polymer comprising one or more of PI, PA, PVDF, siloxane, PEx, and FPE. The dielectric film 202 is preferably composed of paper. The dielectric film 202 preferably has a thickness ranging from approximately 1 µm to approximately 20 µm.

In an example, the first metallization layer 204 is preferably formed on the dielectric film 202 using a conventional foil deposition process. In another example, the first metallization layer 204 is preferably formed on the dielectric film 202 using a conventional metallization process. A thin vacuum-deposited metallization (e.g., zinc or aluminum) is preferably applied to an upper surface of the dielectric film 202. The first metallization layer 204 preferably has a thickness ranging from approximately less than 1 nm to approximately several nanometers.

The first metallization layer 204 is preferably formed using a masking process such that free margins 206 of non-metallized portions of the dielectric film 202 remain. The free margins 206 are preferably formed on each side of the edge of the dielectric film 202. The free margins 206 are preferably formed using a conventional masking process such as oil masking or band masking.

Figure 3:
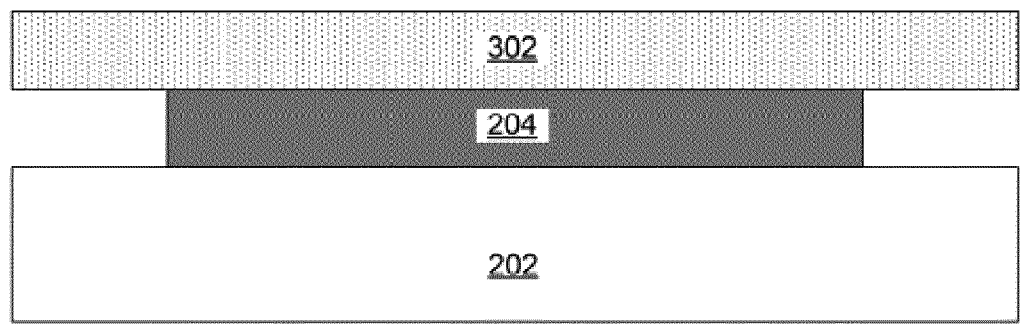
FIG. 3 is a cross section view illustrating forming a dielectric coating on the first metallization layer.

Referring now to FIG. 3, a cross section view illustrating forming a dielectric coating 302 on the first metallization layer 204 is shown. The dielectric coating 302 is preferably composed of an electrically insulating material. The dielectric coating 302 is preferably an acrylic coating or any sub-micron coating having dielectric properties that is preferably applied as a film. The dielectric coating 302 preferably extend over the free margins 206 shown in FIG. 2. The dielectric coating 302 preferably has the same width as the dielectric film 202. The dielectric coating 302 preferably has a thickness ranging from approximately less than 0.1 μm to approximately several microns.

Figure 4:
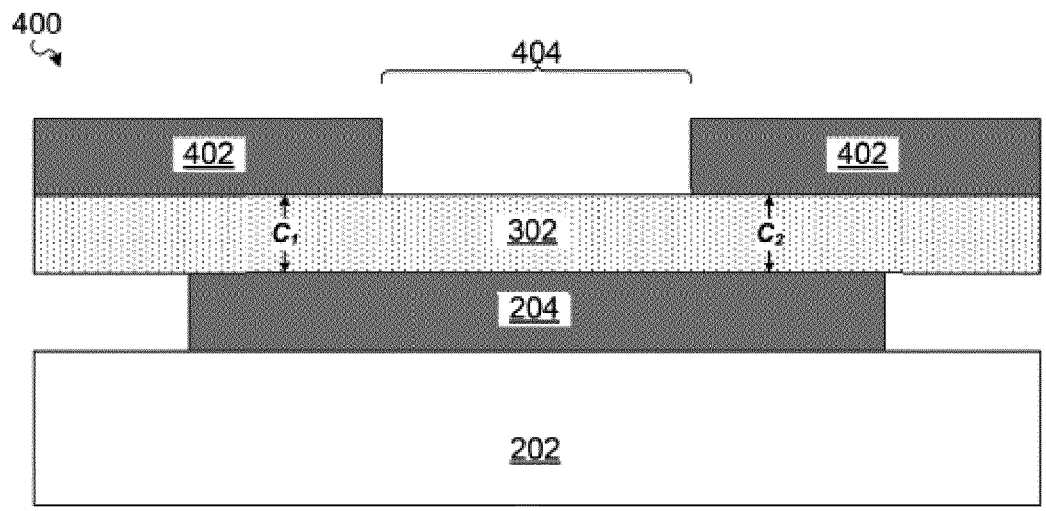
FIG. 4 is a cross section view illustrating forming a second metallization layer on the dielectric coating to form a film capacitor layer.

Referring now to FIG. 4, a cross section view illustrating forming a second metallization layer 402 on the dielectric coating 302 to form a film capacitor layer 400 is shown. The second metallization layer 402 is preferably formed on the dielectric coating 302 using a conventional foil deposition process. In another example, the second metallization layer 402 is preferably formed on the dielectric coating 302 using a conventional metallization process. A thin vacuum-deposited metallization (e.g., zinc or aluminum) is preferably applied to an upper surface of the dielectric coating 302. The second metallization layer 402 preferably has a thickness ranging from approximately less than 1 nm to approximately several nanometers.

The second metallization layer 402 is preferably formed using a masking process such that a gap 404 of non-metallized portions of the dielectric coating 302 remains. The gap 404 is preferably formed using a conventional masking process such as oil masking or band masking.

As shown in FIG. 4, the film capacitor layer 400 preferably has at least one capacitor formed within it. A first capacitor $C_1$ is preferably formed between a first portion of the second metallization layer 402 and the first metallization layer 204. A second capacitor $C_2$ is preferably formed between a second portion of the second metallization layer 402 and the first metallization layer 204. In other words, the first portion of the second metallization layer 402 and the second portion of the second metallization layer 402 preferably form two capacitors in series.

Figure 5:
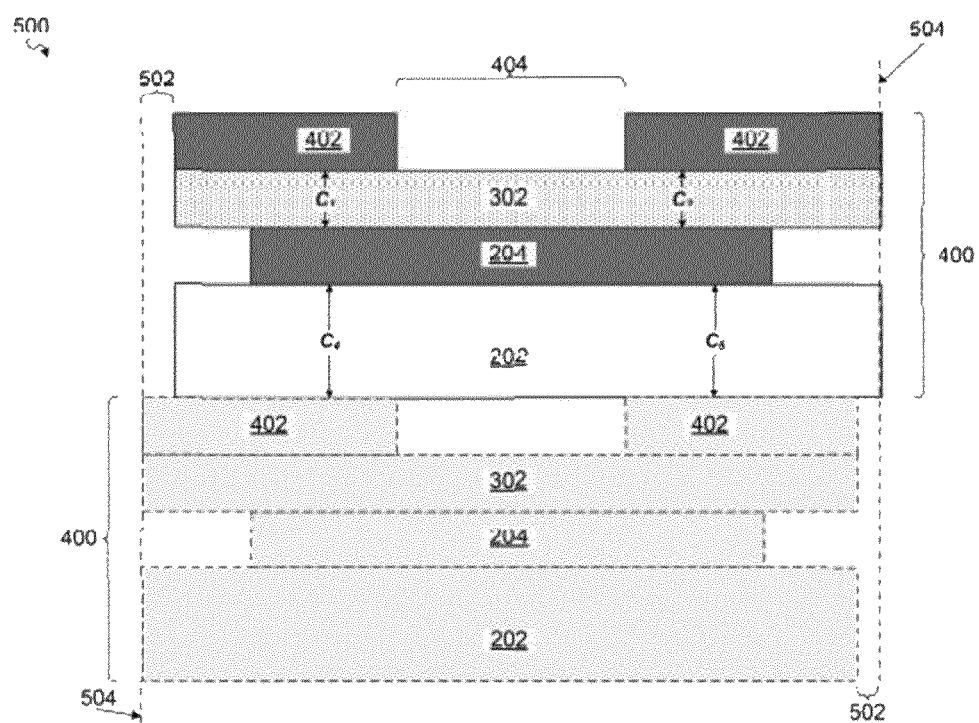
FIG. 5 is a cross-section view illustrating the film capacitor layer in a portion of a winding.

Referring now to FIG. 5, a cross-section view illustrating the film capacitor layer 400 in a portion of a winding 500. As shown in FIG. 5, only one film capacitor layer 400 (i.e., only one dielectric film) is required to be wound to form the winding 500 and ultimately the film capacitor. The film capacitor layer 400 is preferably adjacent to itself in the winding 500. This may simplify the manufacturing process, as only one bobbin (see FIG. 1B) is preferably required to form the winding 500. In addition, the final volume of the film capacitor is preferably reduced by approximately 30-50%.

The film capacitor layer 400 preferably has at least two additional capacitors formed between itself and the adjacent layer in the winding 500. A fourth capacitor $C_4$ is preferably formed between the first metallization layer 204 and the first portion of the second metallization layer 402 in the adjacent layer. A fifth capacitor $C_5$ is preferably formed between the first metallization layer 204 and the second portion of the second metallization layer 402 in the adjacent layer.

As shown in FIG. 5, the film capacitor layer 400 is preferably wave cut before being wound to form the winding 500. The wave cut preferably removes portions 502 from each of the film capacitor layers 400 such that alternating edges of adjacent layers of the film capacitor layers 400 extend out laterally to an outer edge 504 the winding 500. The wave cut preferably allows one side of the second metallization layer 402 of one edge of the film capacitor layer 400 to extend out laterally to make contact with a metallic contact layer 702 and an opposite side of the second metallization layer 402 on an adjacent film capacitor layer 400 to make contact with the metallic contact layer 702, as described in further detail below. The wave cut preferably allows for a good electrical contact between the second metallization layer 402 and the metallic contact layer 402. The wave cut is preferably formed when the film capacitor layer 400 is cut from a wider mother roll.

Figure 6:
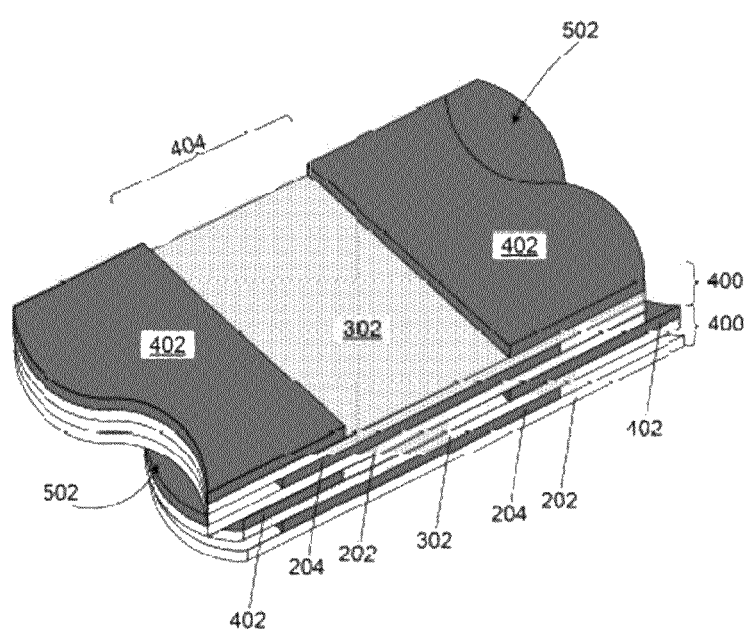
FIG. 6 is a perspective view of the film capacitor layer illustrating a wave cut pattern.

Referring now to FIG. 6, a perspective view of two layers of the film capacitor layer 400 illustrating the wave cut pattern is shown. FIG. 6 illustrates how the film capacitor layer 400 is preferably wound on itself to form the winding 400.

Figure 7:
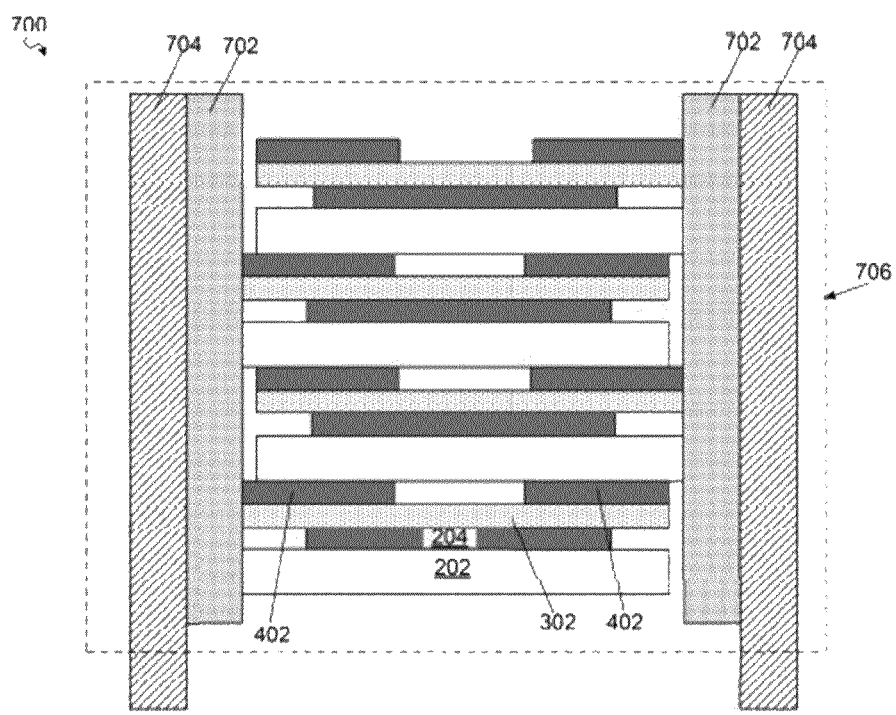
FIG. 7 is a cross section view illustrating a film capacitor formed from the winding.

Referring now to FIG. 7, a cross section view illustrating a film capacitor 700 formed from the winding 500 is shown. The winding 500 is preferably flattened into an oval shape by applying mechanical pressure. Because the cost of a printed circuit board is calculated per square millimeter, a smaller capacitor footprint preferably reduce the overall cost of the circuit.

The projecting end of the second metallization layer 402 is preferably covered with a liquefied contact metal (e.g., tin, zinc or aluminum), to form the metallic contact layer 702. The metallic contact layer 702 is preferably sprayed on both lateral ends of the winding 500 with compressed air. The winding 500 is preferably "healed" by applying a voltage across the second metallization layer 402 so that any existing defects are "burned away." The winding 500 is preferably impregnated with an insulating fluid, such as silicone oil, for increased protection of the capacitor against environmental influences. Terminals 704 are preferably soldered or welded on an outer edge of the metallic contact layer 702 and the winding 500 is preferably encapsulated in an insulating material 706. It should be noted that the film capacitor 700 is shown with a reduced number of repetitions of the film capacitor layer 400 for illustrative purposes. Any number of repetitions of the film capacitor layer 400 is preferably used depending on the application.

In another example, final capacitance of a film capacitor is preferably achieved by capacitors in parallel between different layers in a winding and capacitors in parallel between a dielectric coating.

Figure 8:
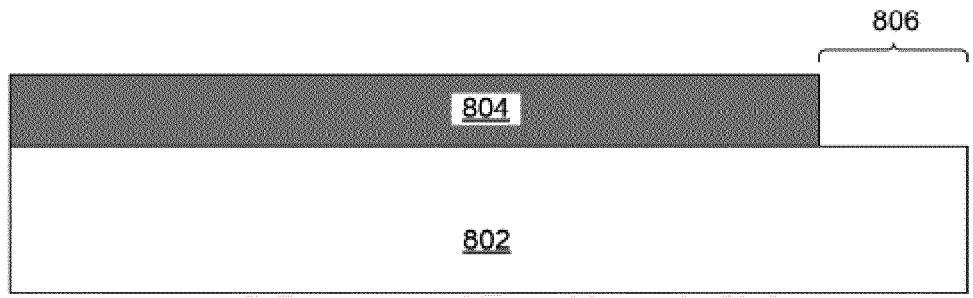
FIG. 8 is a cross section view illustrating forming a first metallization layer on a dielectric film.

Referring now to FIG. 8, a cross section view illustrating forming a first metallization layer 804 on a dielectric film 802 is shown. The dielectric film 802 is preferably composed of an electrically insulating material. The dielectric film 802 is preferably a plastic film comprising one or more of PP, PET, PEN, PPS, PTFE, PS, and PC. The dielectric film 802 is preferably a thermoplastic polymer comprising one or more of PI, PA, PVDF, siloxane, PEx, and FPE. The dielectric film 802 is preferably composed of paper. The dielectric film 802 preferably has a thickness ranging from approximately 1 µm to approximately 20 µm.

In an example, the first metallization layer 804 is preferably formed on the dielectric film 802 using a conventional foil deposition process. In another example, the first metallization layer 204 is preferably formed on the dielectric film 802 using a conventional metallization process. A thin vacuum-deposited metallization (e.g., zinc or aluminum) is preferably applied to an upper surface of the dielectric film 802. The first metallization layer 804 preferably has a thickness ranging from approximately less than 1 nm to approximately several nanometers.

The first metallization layer 804 is preferably formed using a masking process such that a first margin 806 of a non-metallized portion of the dielectric film 802 remains. The first margin 806 is preferably formed on one side of the edge of the dielectric film 802. The first margin 806 is preferably formed using a conventional masking process such as oil masking or band masking.

Figure 9:
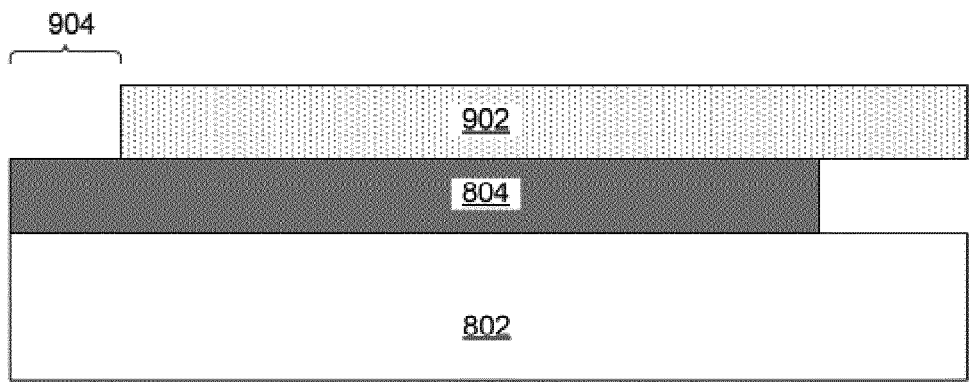
FIG. 9 is a cross section view illustrating forming a dielectric coating on the first metallization layer.

Referring now to FIG. 9, a cross section view illustrating forming a dielectric coating 902 on the first metallization layer 804 is shown. The dielectric coating 902 is preferably composed of an electrically insulating material. The dielectric coating 902 is preferably an acrylic coating or any sub-micron coating having dielectric properties that is preferably applied as a film. The dielectric coating 902 preferably extend over the first margin 806 shown in FIG. 8. The dielectric coating 902 is preferably formed such that a second margin 904 of uncoated first metallization layer 804 is left on an opposite edge of the first margin 802. The dielectric coating 902 preferably has a width less than the dielectric film 202. The dielectric coating 902 preferably has a thickness ranging from approximately less than 0.1 µm to approximately several microns.

Figure 10:
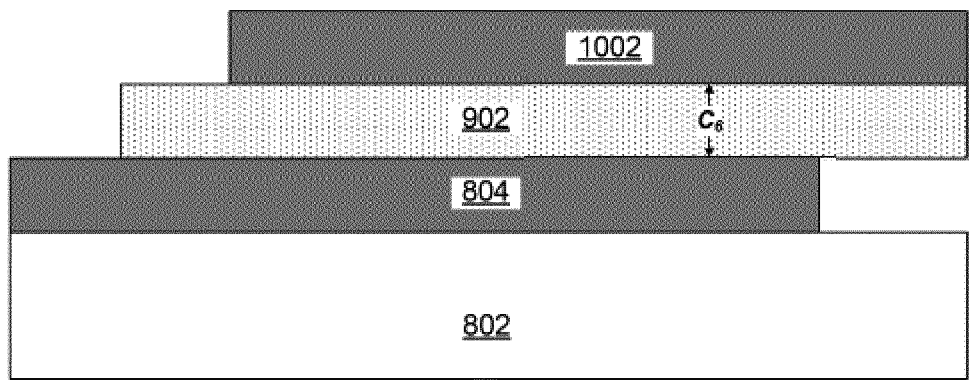
FIG. 10 is a cross section view illustrating forming a second metallization layer on the dielectric coating to form a film capacitor layer.

Referring now to FIG. 10, a cross section view illustrating forming a second metallization layer 1002 on the dielectric coating 902 to form a film capacitor layer 1000 is shown. The second metallization layer 1002 is preferably formed on the dielectric coating 902 using a conventional foil deposition process. In another example, the second metallization layer 1002 is preferably formed on the dielectric coating 902 using a conventional metallization process. A thin vacuum-deposited metallization (e.g., zinc or aluminum) is preferably applied to an upper surface of the dielectric coating 902. The second metallization layer 1002 preferably has a thickness ranging from approximately less than 1 nm to approximately several nanometers.

The second metallization layer 1002 is preferably formed using a masking process such that a non-metallized portion of the dielectric coating 1002 remains on the same edge as the second margin 904. The non-metallized portion is preferably formed using a conventional masking process such as oil masking or band masking.

As shown in FIG. 10, the film capacitor layer 1000 preferably has at least one capacitor formed within it. A sixth capacitor $C_6$ is preferably formed between the second metallization layer 1002 and the first metallization layer 804.

Figure 11:
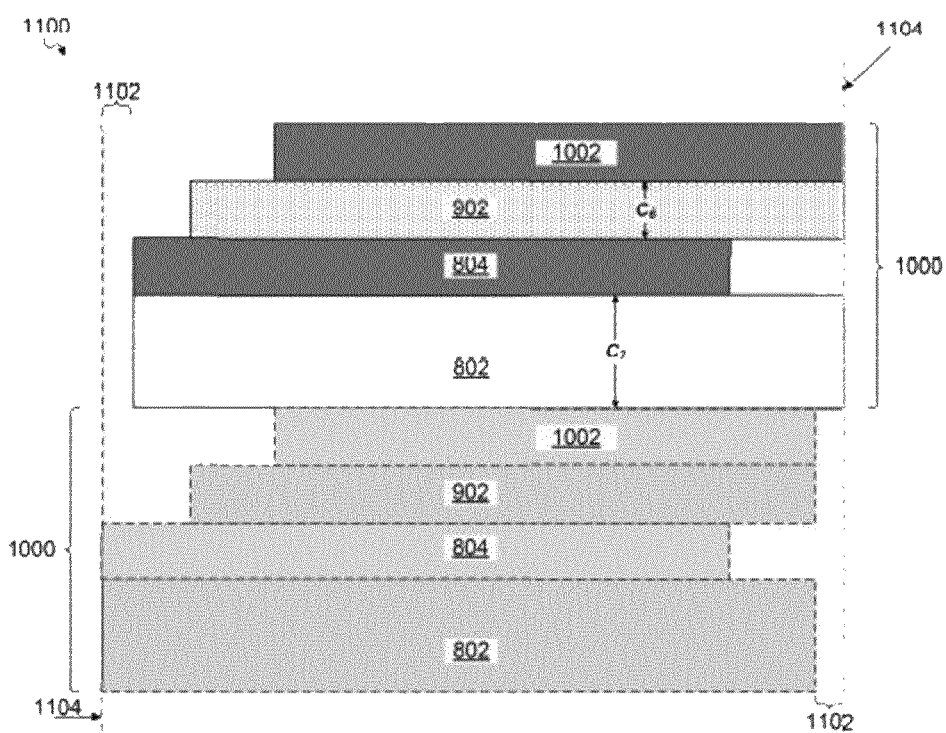
FIG. 11 is a cross-section view illustrating the film capacitor layer in a portion of a winding.

Referring now to FIG. 11, a cross-section view illustrating the film capacitor layer 1000 in a portion of a winding 1100. As shown in FIG. 11, only one film capacitor layer 1000 (i.e., only one dielectric film) is required to be wound to form the winding 1100 and ultimately the film capacitor. The film capacitor layer 1000 is preferably adjacent to itself in the winding 1100. This may simplify the manufacturing process, as only one bobbin (see FIG. 1B) is preferably required to form the winding 1100. In addition, the final volume of the film capacitor is preferably reduced by approximately 30-50%. An additional seventh capacitor $C_7$ is preferably formed between the first metallization layer 804 and the second metallization layer 1002 of the adjacent layer.

As shown in FIG. 11, the film capacitor layer 1000 is preferably wave cut before being wound to form the winding 1100. The wave cut preferably removes portions 1102 from each of the film capacitor layers 1000 such that alternating edges of adjacent layers of the film capacitor layer 1000 extend out laterally to an outer edge 1104 of the winding 1100. The wave cut preferably allows the first metallization layer 804 of one edge of the film capacitor layer 1000 to extend out laterally to make contact with a metallic contact layer 1302 and the second metallization layer 1002 of an opposite edge of an adjacent film capacitor layer 1000 to extend out laterally to make contact with the metallic contact layer 1302, as described in additional detail below. The wave cut preferably allows for a good electrical contact between the first metallization layer 402 and the metallic contact layer 1302 and between the second metallization layer 1002 and the metallic contact layer 402. The wave cut is preferably formed when the film capacitor layer 1000 is cut from a wider mother roll.

Figure 12:
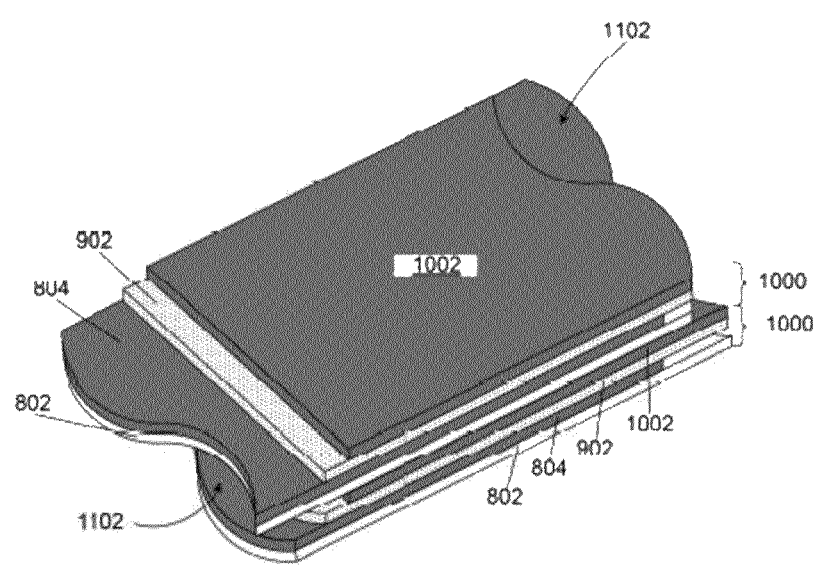
FIG. 12 is a perspective view of the film capacitor layer illustrating a wave cut pattern.

Referring now to FIG. 12, a perspective view of the film capacitor layer 1000 illustrating the wave cut pattern is shown.

Figure 13:
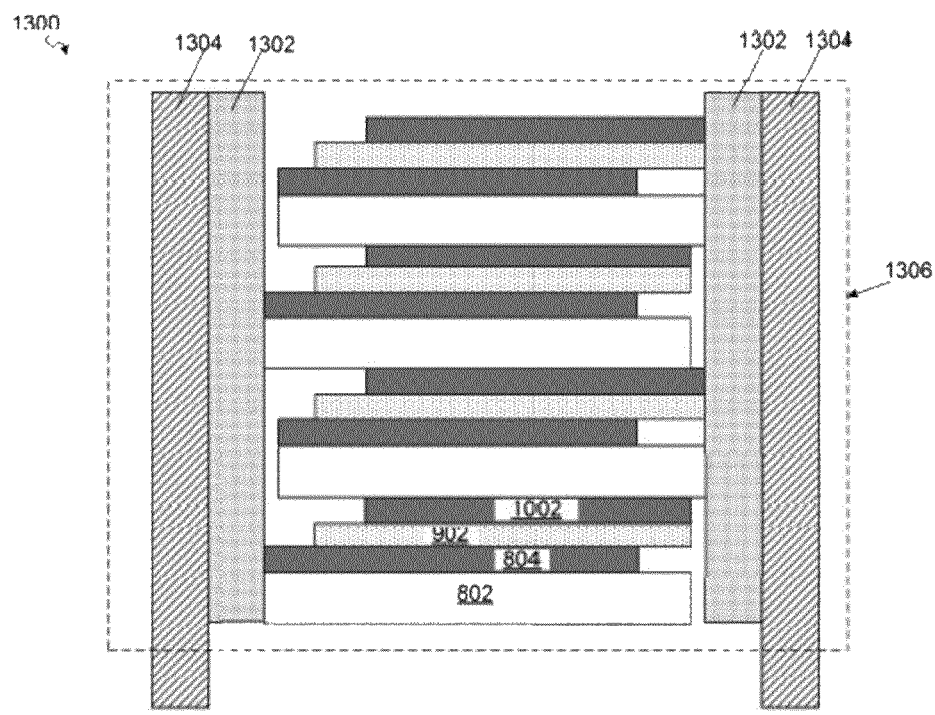
FIG. 13 is a cross section view illustrating a film capacitor formed from the winding.

Referring now to FIG. 13, a cross section view illustrating a film capacitor 1300 formed from the winding 1100 is shown. The winding 1100 is preferably flattened into an oval shape by applying mechanical pressure. Because the cost of a printed circuit board is calculated per square millimeter, a smaller capacitor footprint preferably reduce the overall cost of the circuit.

The projecting end of the first metallization layer 804 and the projecting end of the second metallization layer 1002 on the opposite side of the winding is preferably covered with a liquefied contact metal (e.g., tin, zinc or aluminum), to form a metallic contact layer 1302. The metallic contact layer 1302 is preferably sprayed on both lateral ends of the winding 1100 with compressed air. The winding 1100 is preferably "healed" by applying a voltage across the first metallization layer 804 and the second metallization layer 1002 so that any existing defects are "burned away." The winding 1100 is preferably impregnated with an insulating fluid, such as silicone oil, for increased protection of the capacitor against environmental influences. Terminals 1304 is preferably soldered or welded on an outer edge of the metallic contact layer 1302 and the winding 1300 is preferably encapsulated in an insulating material 1306. It should be noted that the film capacitor 1300 is shown with a reduced number of repetitions of the film capacitor layer 1000 for illustrative purposes. Any number of repetitions of the film capacitor layer 1000 is preferably used depending on the application.

Figure 14:
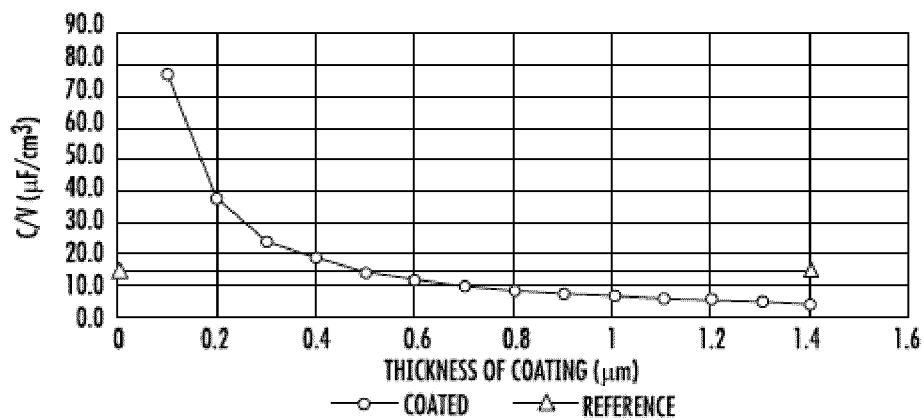
FIG. 14 is a chart illustrating capacitance per volume (C/V) for a first example.

Referring now to FIG. 14, a chart illustrating the capacitance per volume (C/V) of the film capacitor 700 as compared to a conventional metallized film capacitor for a 63V application is shown. In this example, the dielectric film 202 is preferably composed of polyester. The thickness of the dielectric film 202 and the thickness of a dielectric film of the conventional metallized film capacitor layer is preferably approximately 1.4 µm. As shown, the capacitance per volume is preferably measured in $\mu F/cm^3$ on the y axis and the x axis is preferably different thicknesses of the dielectric coating 302 measured in μm. When the dielectric coating 302 is thinner than approximately 0.5 μm, the C/V may be better than the conventional metallized film capacitor.

Figure 15:
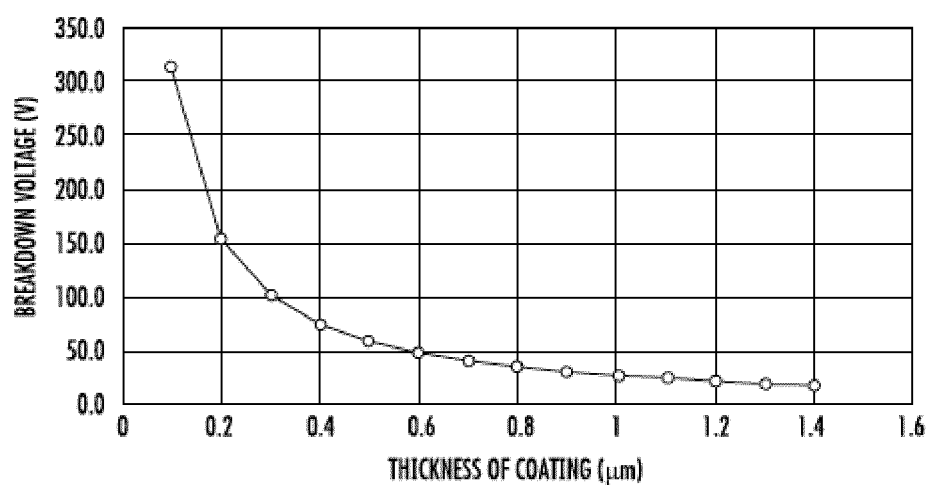
FIG. 15 is a chart illustrating breakdown voltage per thickness of dielectric coating for the first example.

Referring now to FIG. 15, a chart illustrating breakdown voltage per thickness (V/μm) of the dielectric coating 302 for the above application is shown. The thickness of the dielectric coating 302 is preferably as low as approximately 0.1 μm to keep the V/μm in control.

Figure 16:
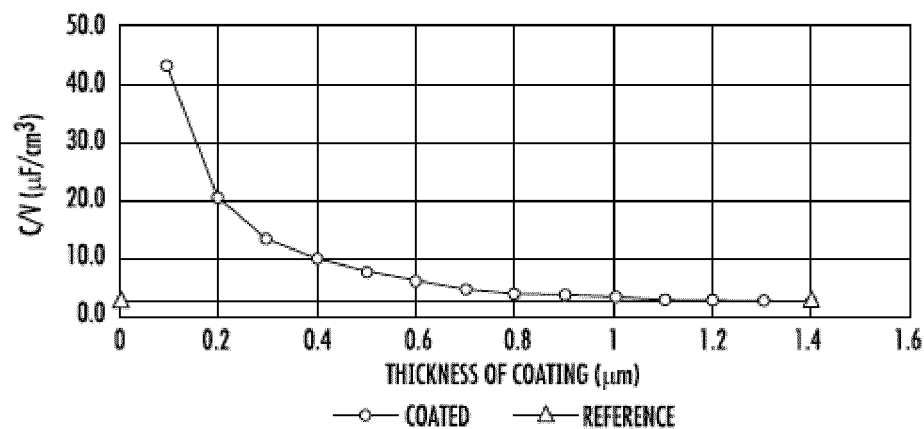
FIG. 16 is a chart illustrating capacitance per volume (C/V) for a second example.

Referring now to FIG. 16, a chart illustrating the C/V of the film capacitor 700 compared to a conventional metallized film capacitor for a 500V application is shown. In this example, the dielectric film 202 is preferably composed of polypropylene. The thickness of the dielectric film 202 and the thickness of a dielectric film of the conventional metallized film capacitor layer is preferably approximately 2.5 μm. As shown, the capacitance per volume is preferably measured in $\mu F/cm^3$ on the y axis and the x axis is preferably different thicknesses of the dielectric coating 302 measured in μm. When the dielectric coating 302 is thinner than approximately 1.2 μm, the C/V may be better than the conventional metallized film capacitor.

Figure 17:
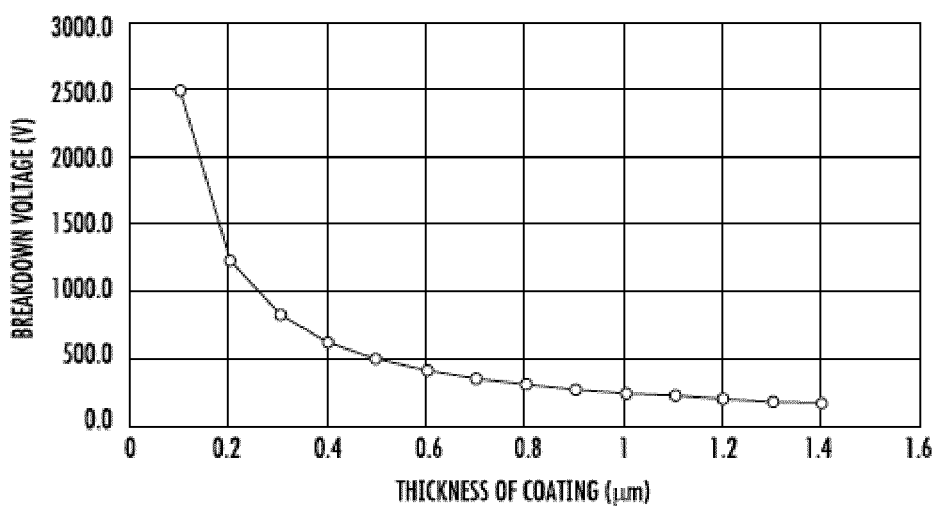
FIG. 17 is a chart illustrating breakdown voltage per thickness of dielectric coating for the second example.

Referring now to FIG. 17, a chart illustrating breakdown voltage per thickness (V/μm) of the dielectric coating 302 for the above application is shown. The thickness of the dielectric coating 302 is preferably as low as approximately 0.4 μm to keep the V/μm in control.

Figure 18:
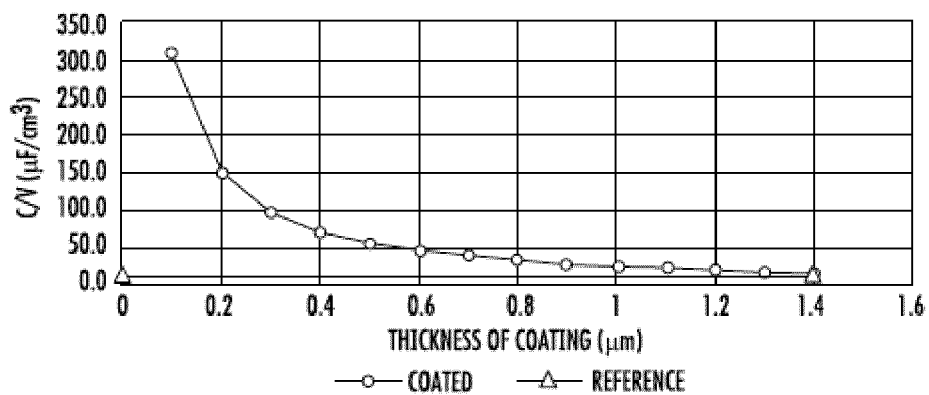
FIG. 18 is a chart illustrating capacitance per volume (C/V) for a third example.

Referring now to FIG. 18, a chart illustrating the C/V of the film capacitor 1300 compared to a conventional metallized film capacitor for a 63V application is shown. In this example, the dielectric film 802 is preferably composed of polyester. The thickness of the dielectric film 802 and the thickness of a dielectric film of the conventional metallized film capacitor layer is preferably approximately 1.4 μm. As shown, the capacitance per volume is preferably measured in $\mu F/cm^3$ on the y axis and the x axis is preferably different thicknesses of the dielectric coating 902 measured in μm. When the dielectric coating 902 is thinner than approximately 1.4 μm, the C/V may be better than the conventional metallized film capacitor.

Figure 19:
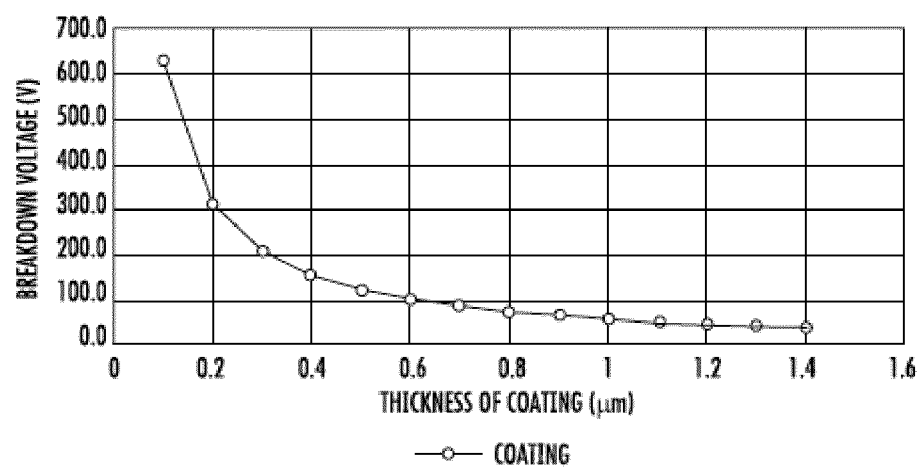
FIG. 19 is a chart illustrating breakdown voltage per thickness of dielectric coating for the third example.

Referring now to FIG. 19, a chart illustrating breakdown voltage per thickness (V/μm) of the dielectric coating 902 for the above application is shown. The thickness of the dielectric coating 902 is preferably as low as approximately 0.15 μm to keep the V/μm in control.

Figure 20:
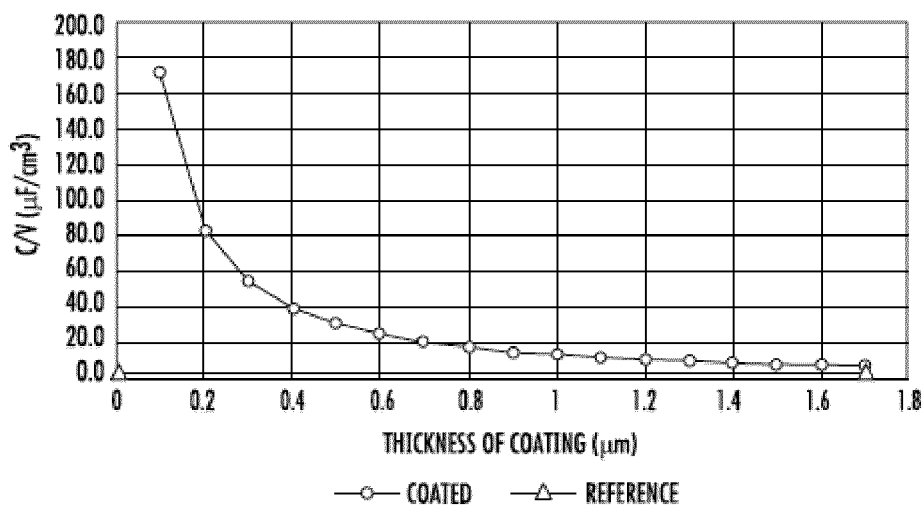
FIG. 20 is a chart illustrating capacitance per volume (C/V) for a fourth example.

Referring now to FIG. 20, a chart illustrating the C/V of the film capacitor 1300 compared to a conventional metallized film capacitor for a 500V application is shown. In this example, the dielectric film 802 is preferably composed of polypropylene. The thickness of the dielectric film 802 and the thickness of a dielectric film of the conventional metallized film capacitor layer is preferably approximately 2.5 μm. As shown, the capacitance per volume is preferably measured in $\mu F/cm^3$ on the y axis and the x axis is preferably different thicknesses of the dielectric coating 902 measured in μm. When the dielectric coating 902 is thinner than approximately 1.7 μm, the C/V may be better than the conventional metallized film capacitor.

Figure 21:
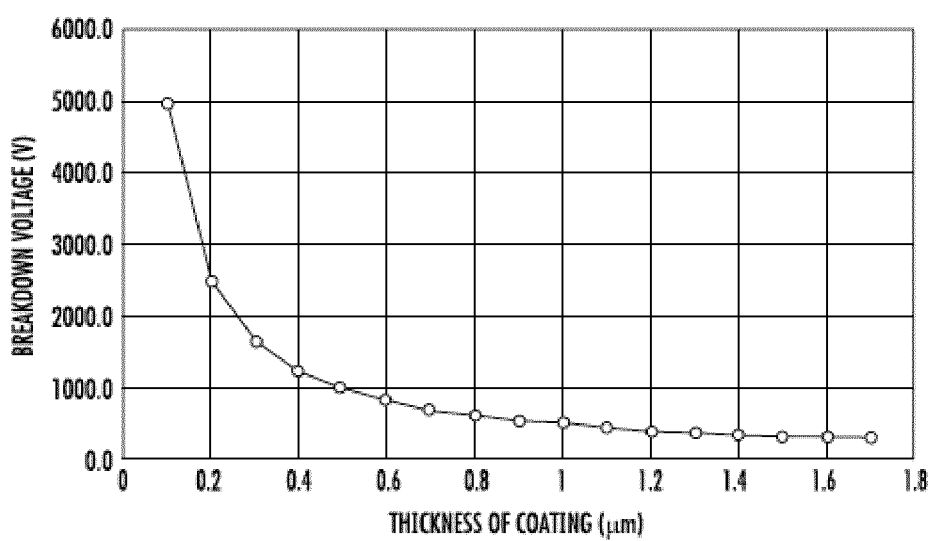
FIG. 21 is a chart illustrating breakdown voltage per thickness of dielectric coating for the fourth example.

Referring now to FIG. 21, a chart illustrating breakdown voltage per thickness (V/μm) of the dielectric coating 902 for the above application is shown. The thickness of the dielectric coating 902 is preferably as low as approximately 1.0 μm to keep the V/μm in control.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A film capacitor comprising:
a single film capacitor layer wound around itself in adjacent layers to form a winding, wherein the film capacitor layer comprises:
a single dielectric film having a first side and a second side opposite the first side,
a first metallization layer formed on the dielectric film,
a single dielectric coating formed on a side of the first metallization layer opposite the dielectric film, and
a second metallization layer formed on a side of the dielectric coating opposite the first metallization layer,
wherein the film capacitor layer has a first outer side comprising the dielectric film, the dielectric coating, and the second metallization layer, and a second outer side opposite the first outer side comprising the dielectric film,
the first outer side and the second outer side being cut in a wave cut such that the first outer side has first alternating areas extending laterally to a first outer edge of the film capacitor layer and second alternating areas curving away from the first outer edge of the film capacitor layer, and the second outer side has first alternating areas extending laterally to a second outer edge of the film capacitor layer and second alternating areas curving away from the second outer edge of the film capacitor layer,
the first alternating areas and the second alternating areas arranged such that alternating edges of the adjacent layers extend laterally to outer edges of the winding, and
wherein the wave cut at the first outer side extends through the second metallization layer, the dielectric coating, and the dielectric film of the film capacitor layer, and wherein the wave cut at the second outer side extends through the dielectric film of the film capacitor layer;
a first metallic contact layer formed on a first outer edge of the winding, and a second metallic contact layer formed on a second outer edge of the winding;
a first terminal formed on an outer edge of the first metallic contact layer, and a second terminal formed on an outer edge of the second metallic contact layer; and
an insulating material encapsulating the winding, the first and second metallic contact layer, and a portion of the first and second terminals.

2. The film capacitor of claim 1, wherein a non-metallized portion of the dielectric film remains exposed along one or more edges of the dielectric film.

3. The film capacitor of claim 2, wherein the dielectric coating extends over the non-metallized portion of the dielectric film.

4. The film capacitor of claim 1, wherein the dielectric film comprises one or more of a plastic film, a thermoplastic polymer, or paper.

5. The film capacitor of claim 1, wherein the dielectric coating has a width that is substantially similar to a width of the dielectric film.

6. The film capacitor of claim 1, wherein the second metallization layer comprises a first portion and a second portion, the first portion of the second metallization layer is separated laterally from the second portion of the second metallization layer by a gap, the first outer edge comprises the first portion of the second metallization layer, and the second outer edge comprises the second portion of the second metallization layer.

7. The film capacitor of claim 1, wherein the dielectric coating has a width that is less than a width of the dielectric film, such that a portion of the first metallization layer is exposed, the portion of the first metallization layer extending laterally to an edge of the dielectric film.

8. The film capacitor of claim 7, wherein the second metallization layer has a width less than the dielectric coating, such that a portion of the dielectric coating and the portion of the first metallization layer remain exposed.

9. The film capacitor of claim 1, wherein the dielectric coating comprises an acrylic coating.

10. The film capacitor of claim 1, wherein the first alternating areas of the first outer side are positioned laterally across from the second alternating areas of the second outer side, and the second alternating areas of the first outer side are positioned laterally across from the first alternating areas of the second outer side.

11. A method of forming a film capacitor, the method comprising:
forming a film capacitor layer comprising:
a single dielectric film,
a first metallization layer formed on the dielectric film,
a single dielectric coating formed on a side of the first metallization layer opposite the dielectric film, and
a second metallization layer formed on a side of the dielectric coating opposite the first metallization layer,
wherein a first outer side of the film capacitor layer comprises the dielectric film, the dielectric coating, and the second metallization layer, and wherein a second outer side of the film capacitor layer comprises the dielectric film;
forming a winding by rolling the film capacitor layer around itself in adjacent layers;
forming a wave cut in a first outer side and an opposite second outer side of the film capacitor layer, such that the first outer side has first alternating areas extending laterally to a first outer edge of the film capacitor layer and second alternating areas curving away from the first outer edge of the film capacitor layer, and the second outer side has first alternating areas extending laterally to a second outer edge of the film capacitor layer and second alternating areas curving away from the second outer edge of the film capacitor layer,
the first alternating areas and the second alternating areas arranged such that alternating edges of the adjacent layers extend laterally to outer edges of the winding, and
wherein the wave cut at the first outer side extends through the second metallization layer, the dielectric coating, and the dielectric film of the film capacitor layer, and wherein the wave cut at the second outer side extends through the dielectric film;
forming a first metallic contact layer on an outer edge of the winding;
forming a terminal on an outer edge of the first metallic contact layer; and
encapsulating the winding, the first metallic contact layer, and a portion of the terminal with an insulating material.

12. The method of claim 11, wherein the first metallization layer is formed using a masking process, such that a non-metallized portion of the dielectric film remains exposed along one or more edges of the dielectric film.

13. The method of claim 12, wherein the dielectric coating extends over the non-metallized portion of the dielectric film.

14. The method of claim 11, wherein the dielectric film comprises one or more of a plastic film, a thermoplastic polymer, or paper.

15. The method of claim 11, wherein the dielectric coating has a width that is substantially similar to a width of the dielectric film.

16. The method of claim 11, wherein the second metallization layer is formed using a masking process, such that a first portion of the second metallization layer is separated laterally from a second portion of the second metallization layer by a gap, wherein the first outer edge comprises the first portion of the second metallization layer and the second outer edge comprises the second portion of the second metallization layer.

17. The method of claim 11, wherein the dielectric coating has a width that is less than a width of the dielectric film, such that a portion of the first metallization layer is exposed, the portion of the first metallization layer extending laterally to an edge of the dielectric film.

18. The method of claim 17, wherein the second metallization layer is formed using a masking process, such that it has a width less than the dielectric coating, wherein a portion of the dielectric coating and the portion of the first metallization layer remain exposed.

19. The method of claim 11, wherein the dielectric coating comprises an acrylic coating.

20. The method of claim 11, wherein the first alternating areas of the first outer side are positioned laterally across from the second alternating areas of the second outer side, and the second alternating areas of the first outer side are positioned laterally across from the first alternating areas of the second outer side.

* * * * *